3,663,618
FLUORINATED CYCLOHEXYLAMINE DERIVATIVES AND COMPOSITIONS EMBODYING THE SAME
Maurice S. Baseman, 5890 Hobart St., Pittsburgh, Pa. 15217
No Drawing. Original application July 18, 1967, Ser. No. 654,090, now Patent No. 3,558,513, dated Jan. 26, 1971. Divided and this application Sept. 8, 1970, Ser. No. 70,595
Int. Cl. C23f 11/00
U.S. Cl. 260—563 R
3 Claims

ABSTRACT OF THE DISCLOSURE

The reaction product of hexafluoroisopropanol with monocyclohexylamine or dicyclohexylamine, or mixtures of both, have been produced. These reaction products have been found to be unusually effective as corrosion inhibitors. The reaction products can be used alone or carried in or on the surface of paper, plastics or other solid materials; they can be added to hydrocarbons, oils, greases, hydraulic fluids and other liquid carriers, either in solution or in suspension, and they prevent rusting of ferrous metals or corrosion of other metals.

BACKGROUND OF THE INVENTION

This application is a division of my copending patent application Ser. No. 654,090, filed July 18, 1967, now U.S. Pat. 3,558,513 issued Jan. 26, 1971.

Prior art

While hexafluoroisopropanol [$(CH_3)_2CHOH$], hereinafter often referred to as HFIP, is known, its reaction products with either cyclohexylamine or dicyclohexylamine, do not appear to have been prepared. Unless otherwise indicated, these reaction products will be generically designated as "HFIP-cyclohexylamine products."

This invention is directed both to the preparation of the reaction product of HFIP with monocyclohexylamine, or dicyclohexylamine, or mixtures of the two, and to preparations of compositions embodying such reaction product, particularly for use in preventing or reducing the corrosion of ferrous and other metals especially under humid or moist conditions.

An important object of this invention is to react HFIP with cyclohexylamine or dicyclohexylamine, or mixtures thereof.

A further object of the invention is to apply to metals the HFIP cyclohexylamine product, or expose the metal surfaces to vapors of the HFIP-cyclohexylamine product, to inhibit corrosion thereof.

A still further object of the invention is to incorporate the HFIP-cyclohexylamine in paper, plastics and other solid carriers, either in the fiber or body structure or on the surface thereof.

Another object of hte invention is to produce liquid; compositions comprising a liquid carrier with HFIP-cyclohexylamine product dissolved or dispersed or otherwise distributed therein, such composition having corrosion inhibiting properties.

Other objects of the invention will be obvious in part and will appear hereinafter in part.

SUMMARY OF THE INVENTION

A reaction product is prepared by admixing hexafluoroisopropanol with monocyclohexylamine, or dicyclohexylamine, or mixtures of the two cyclohexylamines, in proportions of from about 26% to 79% by weight of HFIP, the balance being the cyclohexylamine. Good results are obtained when substantially equimolecular amounts of the reactants are reacted: namely, from about 39 to 40 parts of monocyclohexylamine and from 61 to 60 parts of HFIP, and from 47 to 48 parts of dicyclohexylamine with from 53 to 52 parts of HFIP. The HFIP is a liquid at room temperature, having a melting point of —3.4° C., while cyclohexylamine melts at —17° C. and dicyclohexylamine melts at 0.1° C., and the liquids are readily admixed. An exothermic reaction occurs and a relatively stable crystalline reaction product forms.

The solid reaction product by itself is a good corrosion inhibitor. The solid reaction product will dissolve in an oleaginous vehicle, such as petroleum oils for example, of a viscosity of from 1 centipoise to 100 poises at 25° C., and other hydrocarbons such as kerosene and gasoline, or natural oils, such as castor oil, or mixtures of two or more; and it also can be dissolved or suspended in numerous organic or inorganic liquids. Such solutions or suspensions of the HFIP-cyclohexylamine reaction product can be employed as corrosion inhibitors. The solid reaction product can be incorporated in paper, cloth or other materials and used as a wrapping for ferrous metals to be stored or shipped without corroding.

DESCRIPTION OF THE PREFERRED EMBODIMENTS

The following examples are illustrative of the preparation of the HFIP-hexylamine reaction products:

EXAMPLE I 39.6 parts by weight of monocyclohexylamine is admixed with 60.4 parts by weight of HFIP. Heat is evolved and in a short while a body of crystals was formed.

The crystals melt at about 79–80° F. The reaction product boils at 270° F. The flash point is about 170° F. Petroleum oil of a viscosity of 60 SUS at 100° F. dissolves approximately 7% by weight of the solid reaction product. The solubility in water is about 3%.

Other mixtures varying from 75% monocyclohexylamine to 25% HFIP to 21% monocyclohexylamine to 79% HFIP can be mixed and will form crystalline solids.

EXAMPLE II 47.5 parts by weight of dicyclohexylamine is admixed with 52.5 parts by weight of HFIP. A substantial amount of heat is evolved, and after a brief period a crystalline mass is formed.

The solid reaction product melts at about 150° F. Its boiling point is 250° F. The flash point was tested by heating in a Cleveland open cup, heating of samples being up to 350° F., but no flash point was observed—the samples rapidly evaporating away.

Several other mixtures were prepared, varying from 74% dicyclohexylamine anad 26% HFIP to 21.1% dicyclohexylamine and 78.9% HFIP. These all resulted in crystalline solids being produced.

The following tests were performed employing the reaction products of the above examples:

EXAMPLE III

Into each of a series of glass tubes 125 mm. long by 25 mm. in diameter there was placed 15 ml. of distilled water. One tube with distilled water alone was the control sample, while in the other there was introduced the solid reaction product of Example I, the amounts varying from 0.1% to 3% of the weight of the distilled water. Into each glass tube there was placed a thin 1010 carbon steel panel 100 mm. x 10 mm. in area, the thickness being ¼ inch. Each panel was half immersed in the water. The glass tubes were sealed with a stopper and placed in an oven at 130° F. and held there for 16 hours, then removed and cooled to 40° F. for 6 hours, then placed back in the 130° F. oven for an additional 18 hours. The steel panel in the plain water tube was badly rusted, while in all the other tubes containing the solid HFIP-monocyclohexylamine reaction product, no rusting was observed either in the water immersed portions nor in the exposed portion.

Triaryl phosphates, such as tricresyl phosphates, are widely used as hydraulic fluids. By themselves these triaryl phosphates are not corrosive to metal, but when admixed with water severe corrosion of metal occurs either when in contact therewith or when exposed to the vapors thereof. The following tests illustrate the effectiveness of the compositions of this invention in the triaryl phosphate-water mixtures.

EXAMPLE IV

In a series of screw top jars of a diameter of 5 inches and a height of 3½ inches high, 50 milliliters of water was added to 2½ grams of tricresyl phosphate and swirled to mix up the two liquids. In all but one jar there was present the reaction product of Example I, the solid reaction product being dissolved in the tricresyl phosphate in amounts of from 0.1% to 7% by weight. In each jar there was suspended from the cover a 1010 carbon steel panel, out of contact with the liquid. The jars were then placed in an oven and heated for 16 hours at 130° F., cooled to 40° F. for 6 hours, and finally 18 hours at 130° F. All the panels in the jars having the reaction product present were clean and rust free, while in the control jar the steel panel was heavily rusted in both the immersed and exposed sections.

EXAMPLE V

Petroleum lubricating oils of the 10W type used for automobiles are treated by dissolving therein from 0.1% to 7% of the reaction product of Example I. Steel panels coated with a thin film of the treated oils were placed in a glass jar of the type of Example IV, and the jar is partly filled with water so as to cover half of the panel and cycled as in Example IV. No rusting is evident.

EXAMPLE VI

Into a glass cup 1 inch in diameter and ¼ inch deep was placed 2 grams of the crystalline reaction product of Example II, and the glass cup was placed on the bottom of a glass jar 3.5 inches in diameter and 4 inches high. There was introduced 50 ml. of distilled water into the bottom of the glass jar around the glass cup without introducing any water into the cup and the crystalline product therein. A 1010 carbon steel specimen 1½" x 2" x ¼" was suspended from the lid of the jar out of contact with any liquid. The jar was sealed and cycled as follows: 16 hours at 150° F., 6 hours at 40° F., and 18 hours at 150° F. The steel panel was essentially free from any rust. In a control jar in which no reaction product was present, the steel panel was severely rusted.

EXAMPLE VII

To 95 grams of tricresyl phosphate of a viscosity of 220 SUS at 100° F., there was added 5 grams of the reaction product of Example II. In a test tube 125 mm. x 25 mm. there was placed 5 grams of this mixture and 5 grams of distilled water and shaken. A cylinder of 1010 carbon steel 100 mm. long by 5 mm. diameter was placed in the tube and sealed. The test tube was cycled as follows: 16 hours at 150° F., 6 hours at 40° F. and 18 hours at 150° F. The steel cylinder was then examined and found to be free of rust both where it was immersed in the solution as well as above the liquid level. A control specimen in a tube with only 10 grams of water showed severe rusting.

EXAMPLE VIII

To 97 grams of mineral oil of a viscosity of 60 SUS at 100° F. there was added 3 grams of the reaction product of 74 parts by weight of HFIP and 26 parts of dicyclohexylamine. The reaction product dissolved in the mineral oil.

In the bottom of a jar 3.5 inches in diameter by 4 inches high was placed 5 grams of the oil reaction product solution and 50 ml. of distilled water were added. The contents were swirled around for one minute to thoroughly mix the liquids. A 1010 carbon steel panel 1½ inches x 2 inches x ¼ inch was suspended from the jar lid over the oil-water mixture but out of contact therewith. After cycling for 16 hours at 150° F., 6 hours at 40° F. and 18 hours at 150° F., the steel panel was found to be essentially free of rust. In a control jar with water and oil without any reaction product similarly cycled, the steel panel exhibited severe rusting.

Good results were had on rust inhibition when mineral oil was treated with 4% by weight of the reaction product of Example II and 9% by weight of extreme pressure additive. A steel rod 100 mm. by 5 mm. of diameter placed in a glass test tube so as to be partly immersed by a mixture of an equal volume of the mineral oil composition and water, showed no rusting both on the immersed portions and the exposed portions after cycling as in the prevous example. A rod immersed in the mixture of water with mineral oil and the extreme pressure additive, but without any of the reaction product present showed severe rusting in both the liquid immersed part and the exposed portions.

The HFIP-cyclohexylamine reaction products disclosed herein may be added to metal working lubricants which latter comprise a mixture or an emulsion of water and a hydrocarbon such as oil and bitumens, a solid lubricant or soap, as well as an emulsifier such as a cationic amine salt and an extreme pressure agent, such for instance as a haloorganophosphate—for example monobutyl trichloromethane phosphate. The addition of up to 5%, for example, of the reaction products will reduce rusting of metal parts treated therewith and then drawn, extruded or otherwise evolved, and metal so treated may be safely stored before or after working.

Metal which can be effectively protected from corrosion is steel, cast iron, low alloy content stainless steels, copper, brass and bronze. When dissolved in oils or greases in proportions of 0.1% and greater, the reaction product greatly enhances the retention of clean uncorroded surfaces of parts (such as machinery) coated therewith and stored in humid or tropical conditions or at seaside locations where salt water or sea spray accelerates corrosion.

Such corrosion inhibiting compositions may include other carrier liquids such as synthetic polyesters (for instance diethylene glycol adipate), glycols and even water or monohydric alcohols such as ethyl or propyl alcohol, admixed in various proportions with each other, or with petroleum oils or other fluids, for example silicone oils such as dimethyl polysiloxanes, and fluorocarbon liquids, as well as used individually, with at least about 0.1% of the reaction product therein. Also nitrates, phosphates and chromate inhibitors may be present. The compositions may be pasty or flowable or grease like.

Paper, cloth and felt of cotton, wool, rayon or nylon, for example, can be impregnated with an aqueous, or a volatile organic solvent such as toluene, solution of the HFIP-cyclohexylamine reaction product, and then dried to remove the water or organic solvent. The crystals of the reaction product can be incorporated as a powder in wrapping materials, or admixed with plastic granules such as polyethylene, and then rolled or extruded into a film. These treated papers, cloth or plastic sheets can be used to wrap or package metal parts.

It will be understood that the specification and examples are illustrative only.

I claim as my invention:

1. A product having corrosion inhibiting properties consisting essentially of the reaction product of from about 26 to 79% by weight of hexafluoroisopropanol and the balance being at least one cyclic amine selected from the group consisting of cyclohexylamine and dicyclohexylamine.

2. The product of claim 1 consisting essentially of the reaction product derived from admixing and reacting from 39 to 40 parts by weight of monocyclohexylamine and from 61 to 60 parts by weight of hexafluoroisopropanol.

3. The product of claim 1 consisting essentially of the reaction product derived from admixing and reacting from 47 to 48 parts by weight of dicyclohexylamine and from 53 to 52 parts by weight of hexafluoroisopropanol.

References Cited

UNITED STATES PATENTS

| 3,169,116 | 2/1965 | Baseman et al. | 252—392 |
| 3,422,017 | 1/1969 | Dadura et al. | 260—563 R |
| 3,448,153 | 6/1969 | Cavitt et al. | 260—563 R |

MAYER WEINBLATT, Primary Examiner

I. GLUCK, Assistant Examiner

U.S. Cl. X.R.

21—2.7; 252—58, 390, 392, 396, 403